United States Patent Office 3,325,857
Patented June 20, 1967

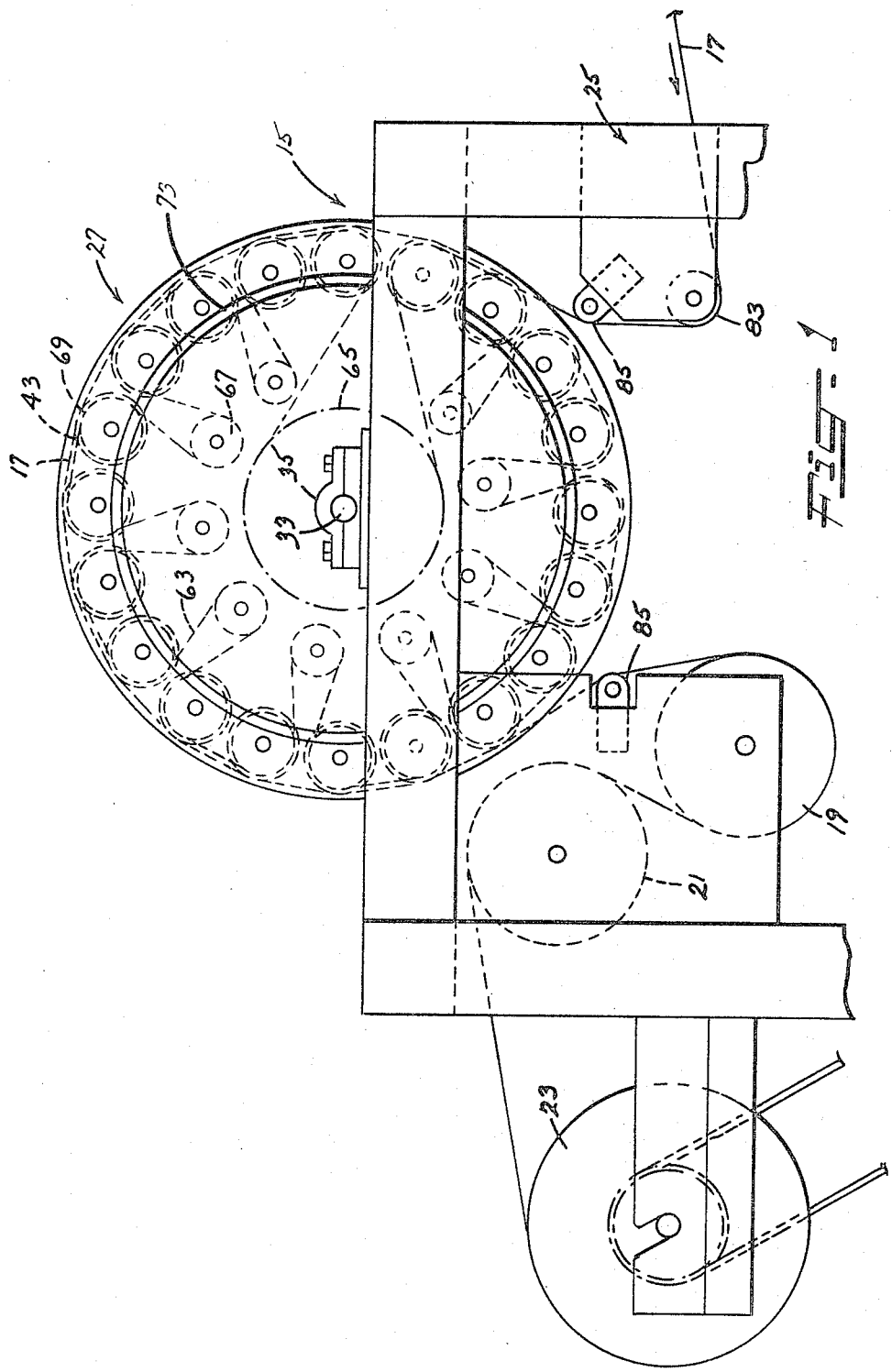

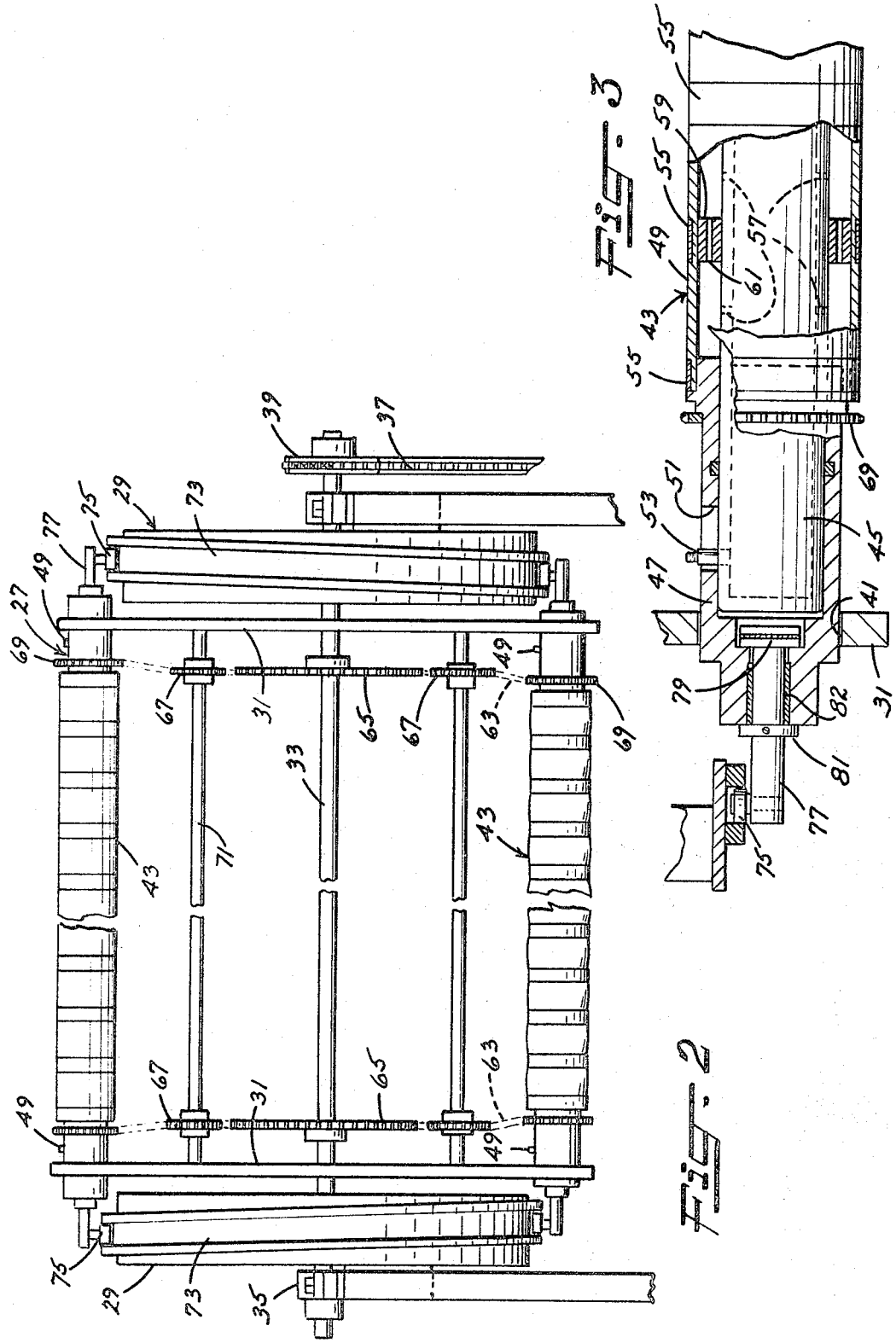

3,325,857
APPARATUS FOR TRANSVERSE STRETCHING OF FILMS
John D. Conti, Elkins Park, Pa., assignor to FMC Corporation, Philadelphia, Pa., a corporation of Delaware
Filed Feb. 9, 1966, Ser. No. 526,274
6 Claims. (Cl. 18—1)

The present invention relates to an improved apparatus for spreading or expanding films and other sheet materials.

In film coating, slitting and other chemical and mechanical operations it is desirable and often necessary that the film being processed be in a wrinkle-free condition and/or be prevented from shrinking. While various equipment has been proposed for achieving such function, none has proven to be entirely satisfactory. For example, with certain of such equipment the degree of film spreading is limited, while with other known apparatus film embossing or other damage often results. Still other known equipment may, in addition, be complicated and/or too costly to construct or operate. Accordingly, a primary object of this invention is to provide a generally new or improved and more satisfactory apparatus for spreading or expanding films and other sheet materials.

Another object is the provision of an improved spreading apparatus which provides for a gradual, continuous and uniform lateral expansion of sheet materials.

Still another object of the invention is an improved spreading apparatus which allows for lateral expansion or spreading of traveling continuous sheet materials and good tracking characteristics.

Still further objects will appear from the following description.

These objects are accomplished in accordance with the present invention by an apparatus which includes, in general, a plurality of longitudinally expandable rolls which are disposed in circular array and are individually rotatable about their longitudinal axes and as a group about a common or central axis.

The rolls each include a thin-walled, elastic, inflated sleeve having an exposed friction surface which serves to grip the sheet material with which it is engaged and spread the same laterally when the roll sleeve is stretched in a longitudinal direction. The plurality of rolls are elongated in sequence, with each roll being stretched progressively and concomitantly with its rotation about its own axis as well as about the common axis. Once a roll reaches a position of maximum expansion, it is permitted to contract and assume a generally longitudinally untensioned condition.

In laterally spreading or stretching a sheet material with the apparatus of the present invention, the sheet material is engaged with the peripheries of a series of adjacent expandable rolls, the first of which is in a generally untensioned condition while the last is longitudinally expanded to about the maximum degree which is desired. The rolls in-between the first and last roll of such series are elongated to different degrees, with each roll being elongated slightly more than the preceding roll of the series. Preferably, the progressive longitudinal expansion of the roll is effected continuously, uniformly and concomitantly with the rotation of such rolls about the common axis. In this manner, a gradual and more uniform spreading of the sheet materials results.

Positive drive means are provided for rotating each of the rolls about its axis and for rotating the rolls as a group about the common axis to insure uniform and consistent results. The degree to which the sheet material is spread may be controlled as by varying the rate and extent of roll elongation and/or by altering the number of expandable rolls with which the sheet material is engaged.

The rolls are stretched longitudinally from the opposite ends thereof to the same extent so that no special tracking problems are introduced. Generally the inflated rolls bulge slightly in a circumferential direction at longitudinally spaced intervals thereof and approach a more cylindrical form as they are longitudinally stretched. This characteristic of the rolls taken with the tension to which the sheet material is subjected, insures that a snug frictional contact exists between the rolls and sheet material throughout the lateral expanding or stretching operation. If desired or found necessary, the sheet material leaving the apparatus of the present invention may be stretched in a longitudinal direction, in accordance with conventional procedures.

The apparatus of the present invention has utility with a variety of sheet materials and can be employed with different sheet material handling equipment. For example, the apparatus may be used to eliminate edge curl and wrinkles from stretchable as well as non-stretchable sheet materials or may be employed to introduce lateral orientation into films formed, for example, of polymeric materials, such as, polyethylene and polypropylene. The surfaces of the expandable rolls are preferably of generally uniform configuration and texture to avoid embossing or other damage to the sheet material which is being spread, and may be roughened to improve their gripping properties, especially when very smooth sheet materials are being processed. For the sake of simplicity and ease of description, the apparatus of the present invention is hereafter described as employed in the lateral spreading of a coated and freshly humidified regenerated cellulose film to render the same flat and wrinkle-free immediately prior to its being wound upon itself in roll form.

In the drawing:

FIGURE 1 is a side view of the apparatus of the present invention;

FIGURE 2 is a front view of the apparatus shown in FIGURE 1, with portions thereof being removed to more clearly illustrate the remaining structure; and FIGURE 3 is an enlarged view illustrating a portion of the apparatus partly in section.

Referring now to the drawing, the spreading apparatus of the present invention is indicated at 15 as employed with a continuous film or web 17 of coated regenerated cellulose. The film 17 may be delivered from a conventional humidifying apparatus, not shown, to first restore moisture into the film before attempting to laterally expand the same. Upon leaving the spreading apparatus 15, the film is laced about driven gripping rolls 19 and 21 and is then wound upon itself as a roll 23. If desired the rolls 19 and 21 may cooperate with a pair of similar rolls, not shown, for expanding the film longitudinally before winding tthe same.

The spreading apparatus of the present invention includes a supporting structure 25, a stretching frame 27, and a pair of cam plates 29. The stretching frame 27 includes a pair of discs 31 which are fixed to a main shaft 33 rotatably carried by bearings 35 attached to the structure 25. A chain 37 is driven by a suitable motor, not shown, and serves to rotate a sprocket 39 fixed to the shaft 33. The discs 31 are each formed with a series of openings 41, with the openings 41 in the opposed pair of discs being aligned for rotatably supporting a plurality of inflatable rolls 43.

As shown in FIGURE 3, each of the rolls 43 includes a hollow shaft 45 which is closed at its opposite ends, trunnion end bearings 47 and an elastic or rubber sleeve 49 having a friction or gripping outer surface. The trunnions 47 of each roll 43 are adapted to rotate within and slide axially of the disc openings 41, as more fully described hereafter. Suitable guide pins 49 project radially from the shaft 45 of each roll 43 and are slidably received in elongated slots 51 formed in the trunnions of the respective rolls. With this arrangement the trunnions 47 of each roll rotate together with their respective shafts, yet are permitted to slide axially relative thereto. In the specific embodiment illustrated in the drawing, a valve 53 has been substituted for one of the guide pins of each roll and serves the same function as such pin, as well as a means for introducing air or other inflating gas into the hollow roll shaft.

The elastic sleeves 49 are attached to reduced diameter end portions of each pair of opposed trunnions 47 by bands 55. A series of openings 57 is formed in each roll shaft 45 for passage of air from such shaft and into the surrounding sleeve 49. Preferably, the sleeve 49 of each roll 43 is inflated beyond its cylindrical shape. Thus additional bands 55 are provided at spaced intervals along the length thereof so as to prevent excessive outward bowing of such sleeve at any one location. Annular spacers 59 are fixed at spaced intervals to the shafts 45 of the respective rolls, to support the roll sleeves 49 in their untensioned conditions, and are formed with openings 61 to permit the inflating air to circulate freely within the roll itself.

The rolls 43 are together rotated at the same speed and in the same direction by endless chains 63, which are driven by sprockets 65 fixed to the main shaft 33, and laced over sprockets 67 and 69 carried by tie rods 71 and the stretching rolls 43. The sprockets 67 are freely rotatable upon the rods 71 while the sprockets 69 are fixed to the roll bearings 47. As shown in broken lines in FIGURE 1, the chain 63 are each laced over a sprocket 65 and then alternately over the sprockets 69 attached to two adjacent rolls 43 and an idler sprocket 67.

Longitudinal stretching of the rolls 43 is achieved by the cam plates 29, each having a cam track 73 for guiding a follower 75 along a desired path. The cam plates 29 are carried by the supporting structure 25 and thus remain stationary. The followers 75 are in the form of rollers which are rotatably carried by arms 77 which project from the opposite ends of each roll bearing 47. As shown in FIGURE 3, each of the arms 77 is locked against axial movement relative to the trunnion bearing 47 by a thrust bearing 79 and collar 81 and is encircled by a sleeve bearing 82 to permit the member 47 to rotate freely relative thereto.

At the start of operations, the rolls 43 are inflated with air so that, in their tensioned condition, some bulging of the sleeves 49 occurs between the bands 55. The film 17 which is to be laterally stretched is led about a guide or conventional curved stretching roll 83, laced over the stretching frame 27 and about the gripping rolls 19 and 21 and then attached to a suitable core when it is subsequently wound as a roll 23. Adjustable guide bars 85 may be employed, if desired, to vary the degree of contact of the film 17 with the stretching frame.

The gripping rolls 19 and 21 and the stretching frame 27 is then set in motion to advance the film 17 in a direction as indicated by the arrow in FIGURE 1. The rolls 43 first engaged by the film 17 are in longitudinally untensioned conditions. However, as the stretching frame 27 moves counterclockwise, as viewed in FIGURE 1, the followers 75 of these particular rolls are gradually and sequentially moved along the diverging cam tracks 73 and thereby stretch the roll sleeves 49 in a longitudinal direction. This longitudinal stretching of the rolls 43 may continue until the film 17 is in position to leave the frame 27 and engage with the first of the gripping rolls 19.

As heretofore mentioned, the exposed friction surfaces of the roll sleeves 49 prevent slippage of the film 17 laterally of the rolls so that the film is stretched gradually and uniformly in a lateral direction. Any tendency for the rolls to shrink radially as they are elongated is concentrated at the bulging areas of the inflated roll sleeves so that no significant reduction in contact between the elongated rolls and film 17 is generally experienced. Further, it will be apparent that in view of the relative sizes of the sprockets 65 and 69, the individual rolls 43 are rotated at a faster rate of speed than the discs 41 so that the film 17 is advanced relative to the rolls 43 concomitantly with the rotation of such rolls about the axis of the shaft 33. Thus lateral stretching of the film 17 can be achieved rapidly, without risk of film slippage relative to the rolls 43 and without the need for any auxiliary means for holding the film against each of the stretching rolls.

It is to be understood that changes and variations may be made without departing from the spirit and scope of the invention as defined in the appended claims.

I claim:

1. Apparatus for laterally spreading a sheet material including a plurality of rolls, each of said rolls including a shaft, end members supported for rotation and mounted on said shaft for slidable movement longitudinally thereof, an inflatable sleeve formed of elastic material extending between and connected to said end members, said sleeve having an exposed friction surface, and a valve for inflating said sleeve, means for lacing a sheet material over and into engagement with certain of said rolls, means for rotating said rolls to advance the sheet material which is engaged therewith, and means for gradually moving the end members of the individual rolls away from each other in sequence so as to expand the sleeves from said rolls longitudinally whereby the film frictionally gripped with the surfaces of the roll sleeves is gradually spread in a transverse direction concomitantly with its longitudinal advancement.

2. Apparatus as defined in claim 1 wherein the end members of each roll are supported between a pair of spaced discs and further including a drive shaft onto which said discs are supported and means for rotating said drive shaft, said rolls extending between and being carried by said discs in a circular array with their end members being supported for rotary and longitudinal sliding movement relative thereto.

3. Apparatus as defined in claim 2 wherein said means for rotating said rolls includes sprockets fixed to said drive shaft and an end member of each of said rolls, an idler sprocket positioned between each adjacent pair of rolls, and an endless chain laced over and around said sprockets so as to rotate all of said rolls in the same direction.

4. Apparatus as defined in claim 3 wherein the sprocket fixed to the drive shaft is of larger diameter than the sprockets fixed to said roll end members whereby the rolls are each rotated at a faster rate of speed than said discs.

5. Apparatus as defined in claim 2 wherein said means for moving the end members of the individual rolls away from each other includes fixed cam means and followers carried by the end members of said rolls and cooperating with said cam means.

6. Apparatus as defined in claim 1 further including a plurality of bands applied about said rolls at spaced intervals to restrict expansion thereof.

References Cited

UNITED STATES PATENTS

| | | | |
|---|---|---|---|
| 2,626,422 | 1/1953 | Lammertse | 18—1 X |
| 2,702,406 | 2/1955 | Reed | 18—1 |
| 2,978,740 | 4/1961 | Maier | 18—1 |
| 3,235,906 | 2/1966 | Conti | 18—1 |

WILLIAM J. STEPHENSON, *Primary Examiner.*